United States Patent [19]

Elliott et al.

[11] Patent Number: 5,251,082
[45] Date of Patent: Oct. 5, 1993

[54] MINIATURIZED DISK FILE PLUGGABLE INTO A CARD TERMINAL

[76] Inventors: Timothy J. Elliott, 6172 Kimberly Dr., Huntington Beach, Calif. 92647; Robert W. Herman, 1034 Basa St., Laguna Beach, Calif. 92651; William L. Cooper, 2-1171 E. Cliff Dr., Santa Cruz, Calif. 95062; Robert S. Smith, 1263 Emory St., San Jose, Calif. 95126

[21] Appl. No.: 714,561

[22] Filed: Jun. 13, 1991

[51] Int. Cl.5 .............. G11B 17/02; G11B 5/37; G11B 5/54; G11B 5/55
[52] U.S. Cl. .............. 360/98.07; 360/97.01; 360/97.02; 360/97.03; 360/99.08; 360/104; 360/105; 360/106; 360/112; 360/126; 360/903
[58] Field of Search .......... 360/97.01–99.12, 360/105, 106, 112, 126, 104, 135, 77.03, 903

[56] References Cited

U.S. PATENT DOCUMENTS

| | | | |
|---|---|---|---|
| 4,631,611 | 12/1986 | Schneider | 360/106 |
| 4,686,592 | 8/1987 | Carroll et al. | 360/98.07 |
| 4,965,686 | 10/1990 | Young et al. | 360/99.08 |
| 5,050,144 | 9/1991 | Henderson et al. | 360/77.03 |
| 5,065,262 | 11/1991 | Blackborow et al. | 360/77.03 |
| 5,093,753 | 3/1992 | Friederich et al. | 360/112 |
| 5,124,867 | 6/1992 | Kitahori et al. | 360/103 |
| 5,166,849 | 11/1992 | Fedeli | 360/112 |

*Primary Examiner*—Robert S. Tupper
*Attorney, Agent, or Firm*—Robert Samuel Smith

[57] ABSTRACT

A disk/file for magnetic recording having overall dimensions of one quarter inch thick by about the size of a standard credit card with pin connectors for connecting into a receptacle such as for pc boards. The file features a rotor mounted on the rims of two disk and a stator external to and coplanar with the disks. An actuator features a "wobble" disk rolling around the inside of a nest of electromagnets and turning a small increment with each excursion around the nest thereby turning the shaft of the head support to actuate the head from track to track. The head support arm includes two sections hinged together and engaged with a third link that orients the head to eliminate head skew. A magnet withdraws the head devices from the disk surface to avoid sticktion when the disks are stationary. The head devices feature thin film cores that are oriented flat to the surface of the disk.

43 Claims, 5 Drawing Sheets

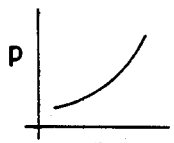
FIG.7
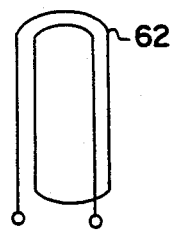
FIG.12b
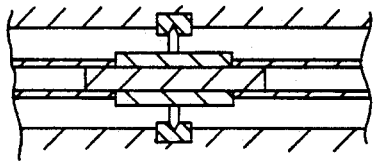
FIG.8
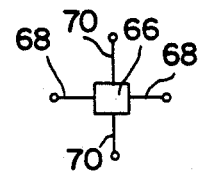
FIG.12c
1. POLISH STAMP SURFACE
2. COAT SURFACE
3. LASER RADIATION
4. PLATE STAMP
5. REMOVE FILM
FIG.9
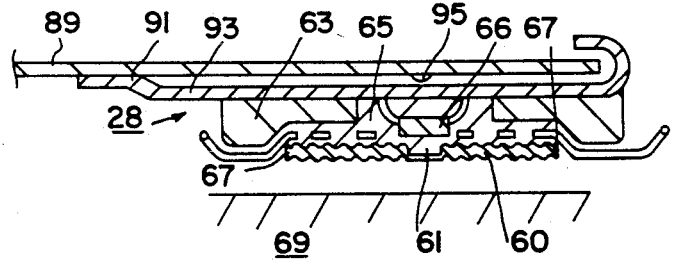
FIG.13
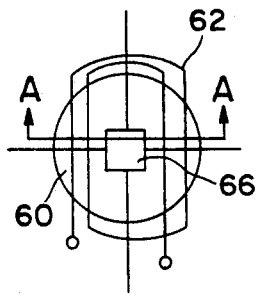
FIG.11
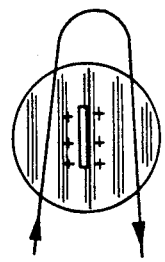
FIG.14
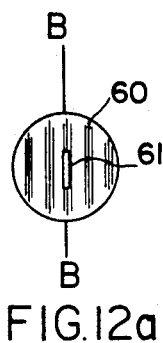
FIG.12a
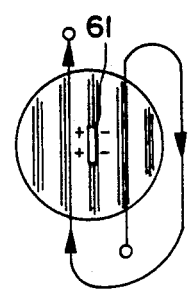
FIG.15

MINIATURIZED DISK FILE PLUGGABLE INTO A CARD TERMINAL

FIELD OF THE INVENTION

This invention relates to disk files and particularly to a miniaturizd disk file that is mountable in a standard printed circuit board array.

PRIOR ART AND INFORMATION DISCLOSURE STATEMENT

Computers have traditionally used the magnetic disk file as a random access erasable memory. The earliest files included disks that were 24 inches in diameter and were permanently housed in a cabinet separate from other components of the computer. Connection of the file to the computer using cable that included lines for read/write, head to track access, motor drive, etc. Operating systems firmware were hard wired into arrays of printed circuit boards plugged into receptacles located in the mainframe housing.

Development of techniques for achieving greater storage density led to the use of smaller disks and later to the development of "floppy" disk files. These files utilized replacable plastic "floppy" disks so that each computer using the floppy disk file had a library of floppy disks in which each disk could be dedicated to a particular purpose. For example, one disk was called the "boot" disk on which was magnetically recorded the disk operating system program.

Other floppy disks contained special programs dedicated to various purposes such as word processing, spread sheet generation, etc. An advantage of the floppy disk technology was that floppy disks containing popular software programs or data of common interest could be readily distributed to numerous computer centers so that a link was established between the computer centers. Furthermore, the size of the memory was determined only by the number of disks in the users library.

Floppy disk technology was limited by a number of factors. One factor was the inconvenience of having to change disks frequently. Another factor was that the recording surfaces were exposed to the environment so that damage with resultant destruction of recorded information did occur. Another problem was that the storage medium was a coating of bonded ferrite which was incapable of storing information at the density later achieved by sputtered films that appeared more recently.

In order to resolve these problems, the I. B. M. corporation introduced the "Winchester" disk file which utilized a "hard" (i.e., rigid) disk that provided much higher stoarge density so that one "hard" disk could be substituted for numerous "floppy" disks. Systems operating programs, software programs and data to be stored temporarily are loaded onto the one rigid disk.

However, the technology providing greater information density also imposed greater necessity for avoiding environmental contamination (e.g., cigarette smoke, etc.). Therefore, the disk is hermetically sealed in the Winchester file and is not detachable from the computer. In small computers such as the laptop computer which may have only a single file this requirement limits the ability of computer stations to interact by simply transferring the disk from one station to another. Larger personal computers require a second file into which floppy disks can be conveniently loaded providing that information may then be transferred to the rigid disk or to semiconductor memory.

In spite of great precautions, the rigid disk file does occasionally "crash" requiring reinstallation of a hard disk. With the"permanent" disk arrangement, replacement of a hard disk is a great inconvenience. It is especially costly if much time and effort has been expended recording data onto the disk. Therefore, it is becoming a practice with larger stations to use a "disk array" which is simply storing information on more than one disk so that if one file fails, a backup file is available to continue the computing operation. This practice is certainly motivation for reducing the cost of the file;

for making installation and retrieval of the file convenient as possible;

for reducing the size of the file.

In another technological area, disks for permanent storage of information have been developed utilizing laser technology. According to these techniques, a laser beam is used to impose a spiral pattern of spots on a mold which is then used to stamp out "compact disks". The compact disk is a plastic substrate whose surface is metallized with an optically reflecting aluminum surface. The "stamped" information following a spiral path on the disk surface is "read" using an optical detector which detects variation in intensity of reflected light due to the stamped pattern.

The cost of manufacturing a disk having a stamped pattern is much less than the cost of imposing a pattern on a disk by magnetic recording in terms of the time required to serially record magnetic information vs. the time required in a stamping process.

Another important reason for reducing the size of the file and incorporating it into the mainframe cabinet has been to shorten the connection between the file and the central processing unit. This is desirable in order to improve signal propagation and reduce noise.

Another motivation for developing a disk file that is less expensive, smaller, and easier to install than files of the present state of the art has to do with the way in which the files have been organized.

Traditionally, computers have been organized along a model proposed fifty years ago by Johm von Neuman in which the memory was regarded as a discrete entity for performing only one function, i.e the storage of both data and instructions. Contents of memory flowed back and forth between the central processing unit and memory in a serial manner through a single channel.

Current interest in artificial intelligence has stimulated an interest to develop a "thinking machine" (i.e., a specialized form of computer) that would be based on the use of numerous modules that embody both fixed subroutines and erasable data that could operate simultaneously with similar modules in the same computer to enable the logic section to "make decisions" and perform operations based on input arriving in parallel from the numerous modules. It would furthermore be advantageous to be able to conveniently substitute one module for another to replace programs and data as the circumstances required.

The dramatic reduction in size of the disk file has been the result of improvements in various areas of the technology.

In head technology, the driving motivation in the development of head technology has been several fold. One object has been to mass produce heads that have very well defined and short gaps in order to be able to read and write information at ever greater bit densities in keeping with the progress in reducing the thickness of the recording media. A second motivation has been to construct the head core with magnetic materials capable of having fast flux change rates.

For the purposes of this specification, a read/write head is defined to mean a head that includes an element that is capable of writing information stored as a flux pattern on magnetic media and is capable of reading information stored as flux pattern on a magnetic medium.

The first head cores made of permalloy laminations were limited in switching rate by eddy curents. Furthermore, the nature of the laminar stack is such that the ability to obtain a short well defined gap is limited. Accordingly, the ferite core with well defined multiple gaps, glass filled, were developed and used in Winchester technology. More recent developments in head technology has been the thin film head with a magnetic "circuit" comprising a thin film and ferrite section.

All of these technologies,—lamination, ferrite, thin film—are characterized by a configuration of the core that occupies considerable space in the direction perpendicular to the recording surface. Furthermore, their design imposes a limitation on the efficiency of the read/write process in terms of the fraction of flux lines across the gap that actually pass through the recording media. This limitation is determined by the ratio of the height of the gap to the length of the gap.

In one version of thin film head technology, a magnetic film is first deposited on a substrate followed by a film of gap material. The length and width of the area of the deposited film determines the length and width of the gap. The areal dimensions and shape of a thin magnetic film also determine overall magnetic properties of a film because of demagnetizing effects. Therefore, in carrying out the construction of a thin film head as discussed supra, there is a limit below which it is not practical to make the area of the film in order to reduce the height and width of the gap.

The relation of magnetic properties to structural characteristics of thin films having a permalloy type composition of thin films has been the subject of extensive investigation (see, e.g., U.S. Pat. Nos. 2,907,680, 3,047,023, 3,019,025 to R. S. Smith, et al). A thin film of permalloy (74% Ni, 24% Fe) is ferromagnetic by which is meant that the film comprises large areas where the film is magnetized in one direction in the plane of the film. The large area of unidirectional magnetization is called a magnetic domain. In the absense of an applied magnetic field, the magnetization will lie in a direction determined, e.g., by the direction of polish marks imposed in the substrate on which the film is deposited.

The boundary between two domains is called a "domain wall". When a film is subject to a magnetic field which exceeds the coercive field of the film, the film will remagnetize by either one of two mechanisms. One mechanism is by the domain wall shift causing some domains to grow at the expense of its neighboring domain. Another mechanism is by domain rotation in which the entire domain rotates simultaneously into the direction of the applied field.

In media technology, the first disks used a coating of ferrite impregnated by phenolic epoxy resin but this medium is being replaced by sputtered films.

In head access technology, the first heads were moved from track to track using a lead screw actuator driven by a rotary stepping motor. This was followed by the voice coils actuatorwhich is essentially a linear coil with a slidable core attached to the head support. A pulse of current to the coil moves the head an incremental distance.

Both the lead screw actuator and the voice coil actuator require an amount of space beyond the radius of the disk that is at greater than the radius of the disk. Both rotary actuators and stepping motors driving a pivoting arm are presently used.

The overall dimensions of the practical linear and rotary actuators that have been used in the past and are used in the present art much bulkier than can be tolerated in accordance with the objects of the present invention.

One of the problems with disk files of the present art having rotary actuators and using recording schemes in which the ratio of the outside track to the inside track is large is that, the gap of a head supported on a rigid arm, that is perpendicular to the tangent of an outside track is not perpendicular to the tangent of the inside track. This problem characteristic is known as "head skew" and results in diminished bit density capability on the inside track.

In drive motor technology, the first disk drive motors were ac motors. Later files used brushless d.c. motors featuring commutation using optical switches or Hall cell switches.

A more recent development features the use of a semiconductor chip in which back emf generated across the stator windings of the motor is impressed on the input of an integrated circuit chip which thereby controls the motor current.

In the early files, the disk was mounted on a spindle separately supported from the motor and the disk was driven by a belt coupled to the motor shaft. In later files the disk shaft was coupled directly to the motor shaft. With these arrangements, the motor has always occupied a significant amount of space, especially adding to the height of the file measured along the axis of the disk.

U.S. Pat. No. 4,902,941 to Merkle et al is for a drive motor featuring a rotor which supports a disk ON TOP OF THE ROTOR and has a stato assembly below the rotor and extending into the area enclosed by the rotor. Although this construction is characterized by reduce height compared to the prior art, the resultant height is still the thickness of the disk plus the thickness of stator and rotor.

U.S. Pat. No. 4,701,653 to Merkle et al is for a disk drive with an internal brake that does not address the problem of reducing dimension.

As the density of tracks of information increased, performance of the disk was subject to variations in ambient temperature due to differential thermal expansion of the disk and head support structure. This led to careful selection of the alloys comprising the disk, head support system etc. (referred to as thermal loops) in order that the thermal expansion of one part would effectively compensate for the thermal expansion of other parts thereby maintaining the head on track.

Another technique for overcoming the head moving off track due to thermal expansion was to magnetically encode servo data on the track boundaries. The servo data is detected once per revolution by the read/write head. The frequency of recording on one side of the track was twice the frequency on the opposite side of the track so that by reading the frequency of the signal detected by the read/write head, it was determined in which direction the head had shifted and head position could be adjusted accordingly.

A major source of particulate contamination in early disk files was bearings used in rotatably supporting the disks. These particles of wear debris are so small that they are subject to migration due to Brownian motion yet they are large enough to cause a "crash" of the head on the disk. (Brownian motion is the random movement of microscopic particles due to thermal energy which is very pronopunced even at room temperature.) Because of this problem, the bearings in Winchester technology are sealed and mounted outside the disk area as shown in FIG. 7. This construction adds expense to the cost of building the file. Furthermore, the bearing construction of the Winchester technology adds a thickness to the overall thickness of the file measured along the axis of the disk which equals the diameter of the bearing balls plus the bearing housing. Nevertheless, this extreme prcaution was a found to be necessary in order to avoid the occurrence of head crashes on the disk.

Some types of air bearings are built with an air bearing surface on one end of the rotor facing an air bearing surface on the other end of the rotor with mating spherical surfaces on the stator. The airbearing separation between the spherical stator and rotor is uniform in order to provide the appropriate pattern of airflow to maintain air pressure for separation of the two surfaces. In this instance, the air in the airbearing space is pressurized to provide a current of air whose speed is much greater than the relative surface velocity of the rotor surface to the stator surface. This substantial speed together with the viscous property of air maintains separation of the stator and rotor surface even when the rotor is not moving.

In recent years, the size of the typical credit card has been adapted as having a convenient size in terms of the ease with which it can be comfortably carried, e.g.,in a purse, wallet or shirt pocket and in terms of the ease it can be inseted in the slot of a cash register, etc. It is also a convenient size in terms of its ability to insert it into an array of printed circuit cards. Therefore, a module having the approximate dimensions of a credit card would be useful for the purposes discussed in the foregoing paragraphs.

THE INVENTION

Objects

It is an object of this invention to provide a disk file/card that has substantially the same length and width as a standard credit card and that can be plugged into a standard memory card receptacle along with an array of cards.

It is another object that the thickness of the file/card have a value less than ¼ inch.

It is an additional object that the cost of the file/card be small compared to disk files of the present state of the art so that a number of file/cards may be positioned within the computer at a substantially smaller cost than would result from using an equal number of files of the present art.

It is another object that the file/card include means for a very accurate head-track servo system resulting in a total number of tracks that is substantially equivalent to the number of tracks used on larger disks of the present art.

It is another object to eliminate head scew in order to be able to record on a large fraction of area of a small disk.

It is another object to provide a disk motor that is sufficiently thin for use in a file/card that is less than ¼ inch thick.

It is another object that the power to drive the motor for the file/card be minimal in order that the power drain required for its use in a portable computer, particularly in simultaneous use with other file/cards, not be prohibitive.

It is another object that the file/card be capabale of storing non-erasable programs or subroutines on the same disk tracks as erasable data thereby enhancing the computers versatility in operating on data.

It is another object to provide a radial head actuator that is dimensionally small, particularly in the axial direction of the actuature which is also the direction of the disk axis, has a very small increment of advance as required for large bit density, and is made of very few inexpensive parts.

It is another object to provide a bearing to support the disks which does not add substantially to the thickness of the file, traps wear debris to prevent migration to the head-disk interface and is inexpensive.

It is another object to provide a disk whose magnetic characteristics provide a large information density capability, is inexpensive, and is small both in diameter and thickness in order to support the object to make a small file.

It is another object to provide a recording head that has a small height perpendicular to the direction of the recording surface, has improved efficiency in terms of a large fraction of flux interaction between the core at the gap and the recording medium and that is amenable to fabrication by mass production "printed circuit and plating" technology.

It is another object to provide a low cost system for establishing parallel interaction between the central processing unit and more than one file/card in the system thereby enabling the central processing unit to make decisions based on simultaneous input from a number of sources.

Summary

This invention is directed toward a disk file mounted on a receptacle for a memory card and having the width and length of the standard credit card and arrangements by which a number of these file/cards can interact together with the central processing unit of a computer.

The disk file includes at least two coaxially mounted memory disks, each having a ring of rotor magnets attached to its rim. The motor stator is a stack of comb shaped laminations substantially arranged coplanar with the disks and positioned outside the space between the disks with the "teeth" of the comblike stack extending toward the rotor magnets.

The stator windings comprise three coils of multiple loops. The coils are connected in a Y configuration with a common center tap connection so that the motor may be driven by a three phase power source in a bipolar mode. Each coil is wound in a pattern around the teeth of the comb which is selected to eliminate "cogging" and minimize power consumption.

The back electromotive force generated across one of the windings is applied to the input of a controller chip which commutates the motor current.

The file/card includes two read/write head devices, each mounted on one end of its own arm. The other end of each arm is pivotally mounted to provide that the heads may be moved from track to track on disk surfaces that face one another. Each head device is a thin film head having a novel construction in which the core lies in the plane of the recording surface thereby reducing dimensions of the assembly of head devices in the direction perpendicular to the recording surface.

In one embodiment, each disk comprises a molded polycarbonate substrate coated with metallized magnetic recording medium.

In another embodiment, each disk comprises a metal substrate coated with a metallized magnetic recording medium.

The disk recording surface is provided with a pattern of indentations, substantially circumferentially arranged. These indentations provide permanent signals that can be read with a read/write head device that may also read/write erasable information stored on the same track. The indentations may be subroutines or provide track and sector identification.

In one embodiment, indentations may be inscribed on both sides of the track and read with a magnetostrictive element to servo the head to the track.

The head assembly acutating device that moves the head devices from track to track is a novel rotary stepper motor featuring a "wobble" disk drive. The actuator includes a drive disk which is rotatably mounted on a center shaft from which the arm supporting the heads extends radially. A wobble disk, with a center hole larger than the center shaft and through which the center shaft passes, is APPROXIMATELY COAXIAL and in parallel proximity to an inside flat surface of the drive disk. The wobble disk has radial slots in its surface which slidably engage cogs on the inside flat surface of the drive disk. Three electromagnets are arranged in a circle around and outside the periphery of the wobble disk. When the coils are excited by a a three phase signal, the woble disk is pulled first toward one electromagnet, then the neighboring electromagnet, and so on so that the wobble disk turns a small increment every time the trio of magnets is excited once. The width of the radial slots are slightly larger than the diameter of the cogs so that the cogs are pushed a small increment every time the wobble disk makes one excursion thereby causing the drum to turn a small increment with each excursion. The small increment depends only on the difference in the diameter of the wobble disk and diameter of the circle formed by the curved locus of the pole pieces facing the edges of the disk and therfore can be controlled very closely. The direction of (incremental) rotation of the drum depends on the direction of phase shift of the three phase signal.

In order to eliminate head scew, the arm supporting the head consists of two sections hinged to-gether, one end to one end and forming a joint between the sections. A link member is pivotally attached at one end to the housing and at the other end to a location on the first member. When the actuator turns the arm support assembly, the link causes the joint to turn such that the head gaps are maintained perpendicular to the track thereby eliminating skew. When it is desired to withdraw the head from the disk surface, the second section is subject to a magnetic field either by swinging the arm support toward a magnet or by an electromagnet adjacent to the second member, thereby withdrawing heqd device on the end of the second section away from the disk surface.

DRAWINGS

Figure 3A:
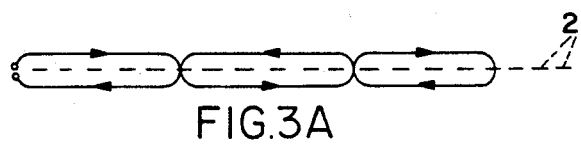
Figure 3B:
Figure 3C:
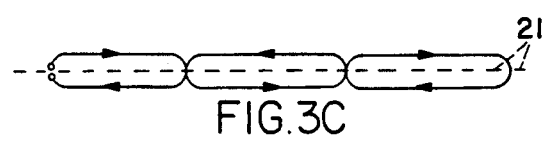

FIGS. 3 A, B and C illustrate the pattern of wrap of the loops of wire of the stator.

Figure 4:
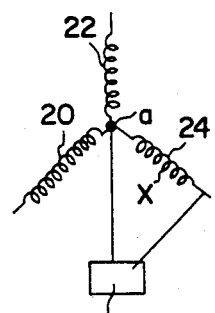

FIG. 4 illustrates the electrical connections to the stator windings.

Figure 5:
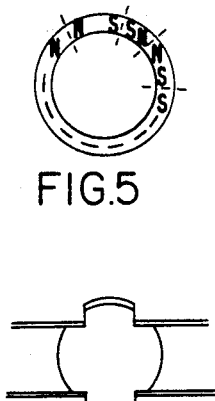

FIG. 5 illustrates the flux pattern of the rotor.

Figure 6:
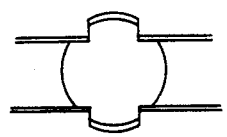

FIG. 6 is a cross sectional view of one embodiment of the bearing for rotatably supporting the disks.

FIG. 7 shows the distribution of pressure within the bearing of FIG. 6.

FIG. 8 shows a second embodiment of a bearing for rotatably supporting the disks.

FIG. 9 shows the flow diagram of the steps in making the die for molding or stamping the disks.

Figure 10:
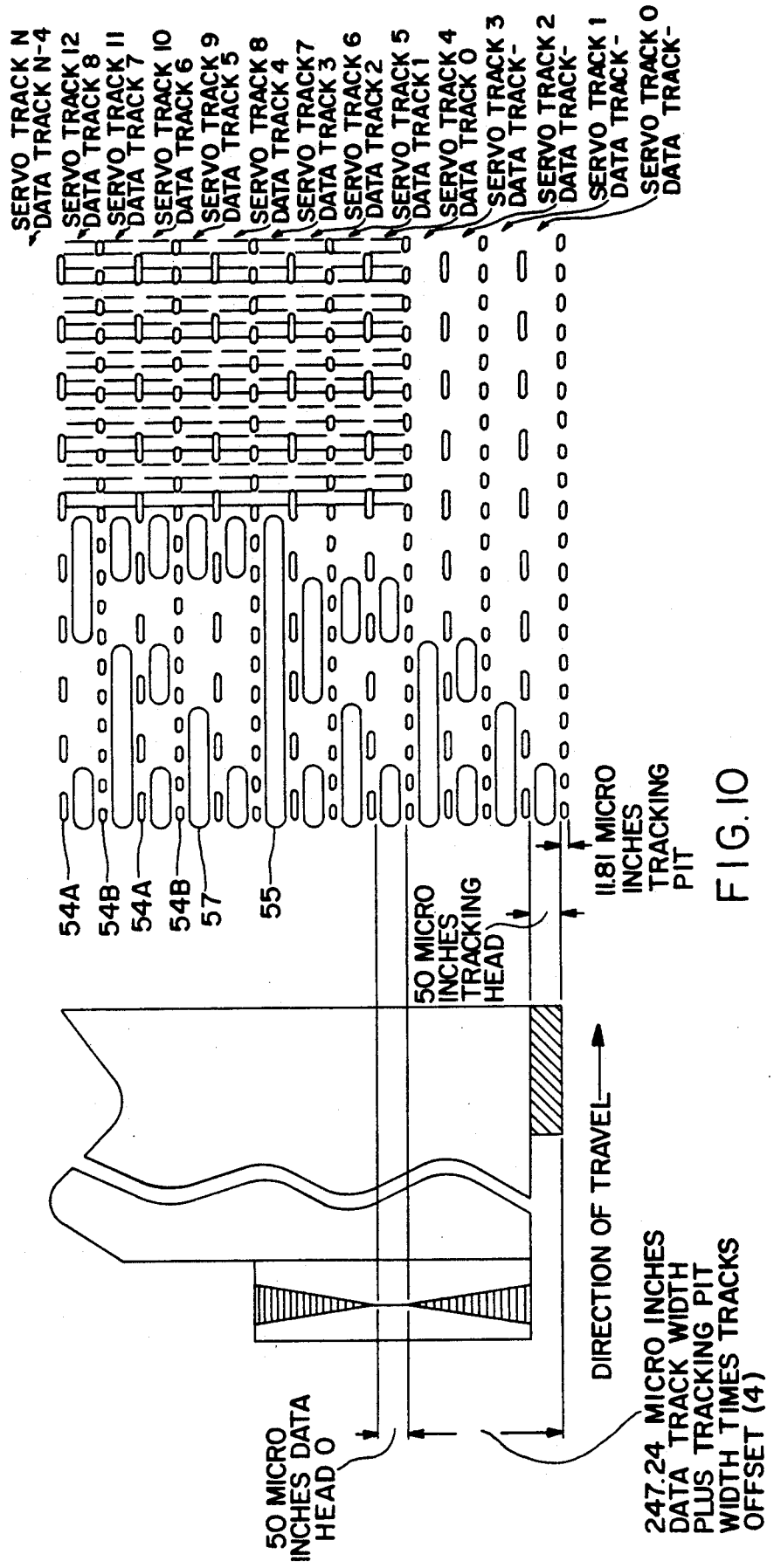

FIG. 10 shows a section of the disk surface containing a pattern of pits coresponding to permanently stored information such as servo tracks, track and sector identification, etc.

FIG. 11 shows one flat film head device configuration that is particulary efficient for vertical recording.

FIGS. 12(A)-12(C) is an exploded view of the head device of FIG. 11.

FIG. 13 is a sectional view of the head device of FIG. 11.

FIG. 14 is a top view of the head device of FIG. 11 showing the orientation of the flux.

FIG. 15 is a top view of a second flat film head device that is especially efficient for horizontal recording.

Figure 16A:
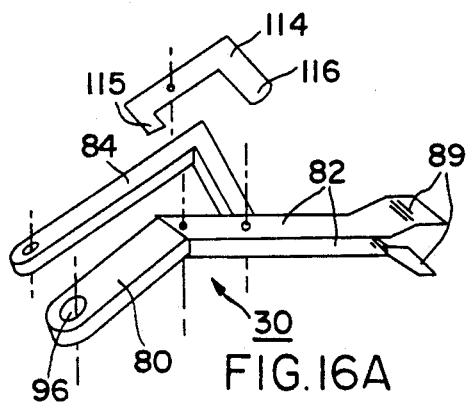
Figure 16B:
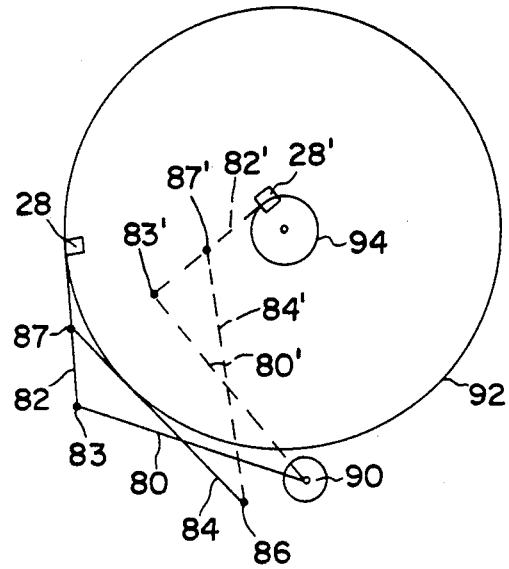

FIGS. 16(A) and 16(B) shows an arm assembly for supporting the head assembly featuring elimination of head scew.

Figure 17:
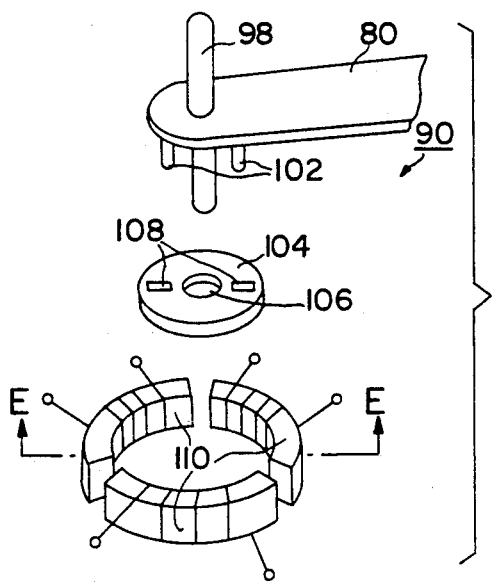

FIG. 17 shows an exploded view of a stepper motor featuring a "wobble" disk.

Figure 18:
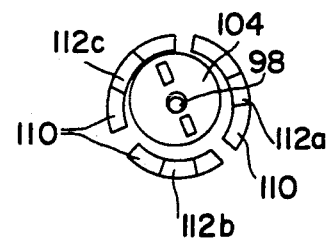

FIG. 18 is a sectional view of the actuator of FIG. 17 showing the wobble disk in relation to the electromagnets.

Figure 19:
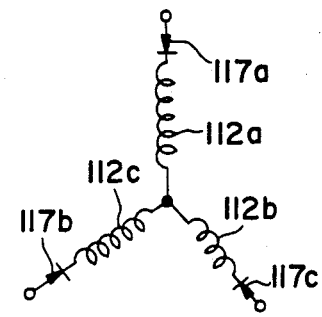

FIG. 19 shows the electrical connections of the coils of the actuator electromagnets of FIG. 18.

Figure 20:
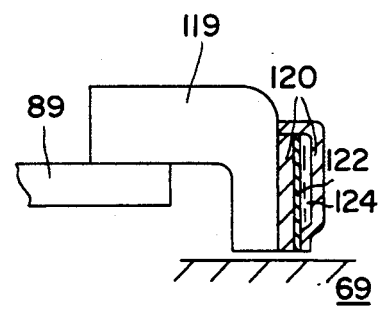

FIG. 20 shows a second embodiment of a thin film head device.

Figure 21:
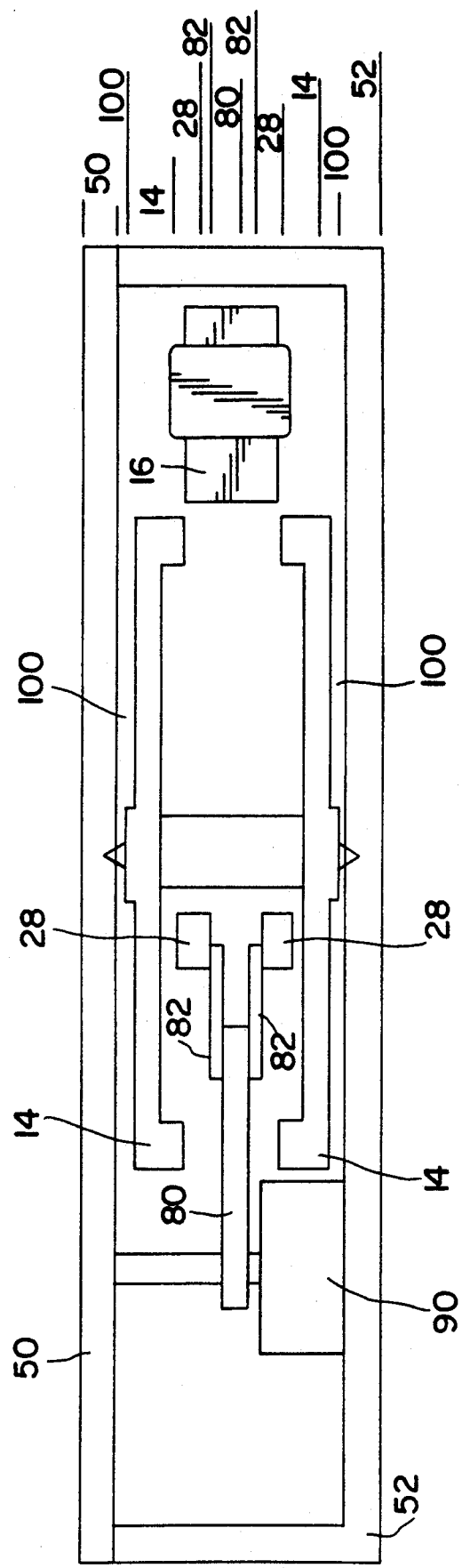

FIG. 21 shows the file/card assembly in cross section.

DESCRIPTION OF THE PREFERRED MODE

The following detailed description illustrates the invention by way of example and not by way of limitation of the principles of the invention. This description will clearly enable one skilled in the art to make and use the invention, and describes several embodiments, adaptations, variations, alternatives and uses of the invention including what we believe to be the best mode for carrying out the invention.

Figure 1:
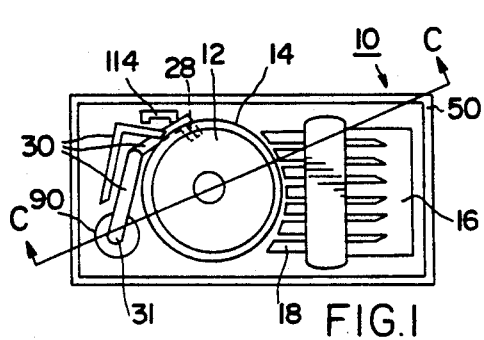
FIG. 1 shows a top view of the file/card with the lid removed from the housing to reveal the arrangement of the omponents of the file/card.
Figure 2:
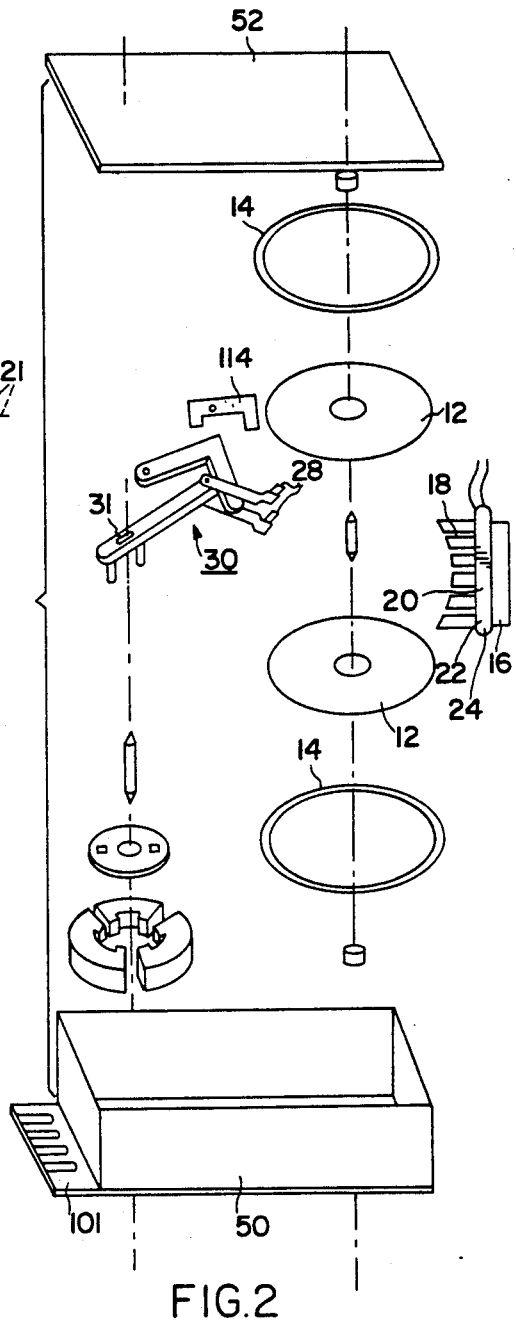
FIG. 2 is an exploded view of FIG. 1.

Turning now to a discussion of the drawings, FIG. 1 shows in perspective a file/card assembly 10 of this invention. FIG. 2 shows an exploded view of the file/card assembly of FIG. 1.

FIGS. 1 and 2, shows a housing comprising a box 50 with a lid 52. The lid is removed from the box in FIG. 1 to show the positioning of the disks, stator assembly, head assembly support arm, etc., all mounted in the box.

There is shown two disks 12 with a permanent magnet array ring 14 secured to the rim of each disk.

A stator includes a stack 16 0.120 inches overall thickness and comprising eight laminations. The stator has a comb-like configuration positioned parallel to the disks with the ends of the "teeth" of the comb forming an arc adjacent to the ring of rotor magnets on the rim of the disks.

As shown in FIG. 4, the arc formed by the teeth lies "AROUND AND OUTSIDE" the rims of the disks. This feature makes possible a reduction of the thickness of the file measured in the direction perpendicular to the disk surface (as shown in FIG. 10) compared to structures of files having the stator locatd between between the disk and housing wall. The reduction of this dimension is a major advantage in file architecture. In the context of this specification, "AROUND AND OUTSIDE THE RIM" is understood to mean structure as shown in FIGS. 4 and 22 where the stator poles lie on an arc around the outside of the disk.

The stator includes three coils, 20, 22 and 24, wrapped around the teeth of the "comb". Each coil consists of 50 loops. The pattern of wrap of each of the loops is shown respectively in FIG. 3 A, B and C which show the ends 21 of the teeth 18. Although each of the loops has a total of 50 loops of number 36 gage wire, only one loop of each coil is shown for clarity in FIGS. 3 A, B and C. The staggered tooth wrap shown in FIGS. 3 A, B and C is preferred to other patterns of wrap because it eliminates "cogging" and because this loop arrangement provides for an optimal number of lines of magnetic flux cut per loop.

The coils are connected in a Y configuration as represented in FIG. 4. Other schemes for connecting the coils may be used in place of the Y configuration such as a "delta" configuration in which the coils are connected one end to one end end and these alternative schemes are within the scope of this invention. However, the Y connection is preferred because of the simplicity of connecting together one end of all the loops to provide a center tap connection.

Referring to FIG. 4, connection is made between the ends of loop 24 (points a and b) and the input terminals of a controller (Integrated Circuit) chip 26. The back electromotive force generated in loop x by the revolving rotor is thereby sensed by the chip enabling the chip to commutate the motor current in the stator windings. A chip that can be used for this purpose is motor drive IC number SST 32 m595 manufactured by SILICON SYSTEMS of Irvine, Calif.

Alternative methods of commutating the motor current may be accomplished using Hall effect switches or optical switches using techniques that are well knon in the art and all of these techniques are within the scope of the invention.

Each magnetic rim rotor is divided into 20 sectors whose flux paths are illustrated in FIG. 5. which shows ten north poles and ten south poles distributed around the rim. The large number of poles helps to eliminate cogging.

Referring to FIGS. 1 and 2, recording is performed on two disk surfaces facing each other with a head device 28 on each surface. The head devices 28 are especially constructed in accordance with the embodiments of this invention to provide minimal dimension of the assembly of head devices in the direction perpendicular to the recording medium. FIG. 12 is a top view of a head device construction having a flat film configuration to meet this object and is therefore an embodiment of this invention. FIG. 13 shows the separate parts of the head device of FIG. 12. FIG. 14 is a sectional view of FIG. 12 taken along line of sight AA of FIG. 12.

FIG. 13 a shows a circular patch of thin film, 60. The film is preferably permalloy (74% Ni, 24% Fe) in order that the film have a low coercive force. The circular shape ensures that there will be no demagnetizing field that would influence the magnetization of the film. The film has a centrally located slit 61 which is the gap. The film has unidrectional ridges indicated by the broken lines which establishes that, in the absence of an applied magnetic field, the magnetization in the film will be parallel to these ridges.

FIG. 13b shows a coil 62 that overlays the film and comprises loops, each having a straight section 63a and 63b and a curved section 64. Sections 63a and b are at a slight angle, B, to the ridges.

When no current is passed through the coil 62, the magnetization will lie parallel to the ridges. When WRITE current is passed through the coil, the magnetization will turn perpendicular to the ridges in a direction depending on the direction of current in the windings so that magnetic poles of the same polarity will be generated on opposite sides of the gap as shown in FIG. 15. There will be a strong magnetic field generated in the gap perpendicular to the recording surface which is favorable for vertical magnetic recording.

FIG. 13c shows a semiconductor (Hall effect) element 66 that straddles the gap and has two current conductors 68 and two Hall voltage detection connectors 70 on opposite sides of semiconductor element 66. In order to "read" the information on the recording surface, current is passed through leads 68 and a Hall voltage corresponding to the field from the flux originating in the recording medium is detected across leads 70.

A flat film head assembly that is favorable for horizontal recording is shown in FIG. 16. The difference in the construction of the two embodiments is that the current through the write winding passes in one direction, only over the entire area of the film. Therefore, as shown in FIG. 16, when current is passed in one (clockwise) direction through the flat coil, north poles will be generatied on one side of the gap, 61 and south poles will be generated on the opposite side of the gap. When the direction of current is reversed, the polarity of the field is reversed.

FIG. 14 shows the package including the ferromagnetic film, flat coil, and Hall detector is supported on a substrate including a ferrite core 63 and insulating molding 65. The substrate is shown partially cutaway in FIG. 14. The ferrite substrate provides that flux emanating from the edge 67 of the ferromagnetic film 60 will not penetrate the magnetic recording surface 69.

FIG. 21 shows another head device in cross section which is an embodiment of this invention beacuse of the novel means of support which provides for a short dimension measured perpendicular to the recording surface 69. There is shown a glass "hoe" 119 attached to a surface of end 89 of head support section 82. The active parts of the head device include the ferromagnetic film 120, the gap layer 122, and turns 124. This construction is in contrast to the bulkier ceramic shoes used to support thin film head elements of the prior art.

As shown in FIGS. 1, 17, etc., each head device 28 is supported on the end of a head support assembly which comprises an arm support 30 and an actuator 90. The head assembly (which comprises two head devices 28) is mounted on one end of the arm support 30 whose other end 31 is mounted on the actuator 90 to pivot about an axis parallel to the disk axis. Access of the assembly of head devices to each track occurs by rotation of the arm assembly 30 about the pivotal axis of the actuator.

In order to eliminate head skew and as shown in FIG. 17, the arm assembly 30 comprises two sections 80 and 82, each section having an end that is pivotally attached to an end of the other section. A link 84 is pivotally connected on one end to a stationary location 86 on the housing 50 and at a location 87 on sedtion 82. Referring to FIG. 17B, as the head actuator 90 rotates the arm assembly 30 to move the head devices 28 from an outside track 92 toward an inside track 94, the link 84 causes the joint 83 to bend thereby maintaining the head gap perpendicular to the tangent of the tracks and minimizing head scew.

FIG. 17A shows a view of arm support section 82 that is attached to the head devices 28 comprising two parallel strips 82 pivotally attached at an end to arm section 80. The ends 89 of each strip 82 are contoured so that a head element 28 (not shown in FIG. 17 but shown in FIGS. 14, 21, 1 and 2) may be mounted on the ends 89. FIG. 14 shows the head device 28 joined to strip end 89 at location 91 by flexible band 93. A dimple 95 in strip 89 transmits spring force from the strip end 89 to the center of head element 28.

FIG. 17 shows details of head lifter 114 (shown also in FIGS. 1 and 2) which lifts the head from the disk surface when it is intended to stop the disk. Lifter 114 is magnetized. When the actuator 90 moves the head assembly to the outside of the disk, link 90 pushes against location 115 causing the end 116 to swing between strips 82 thereby magnetically attracting the strips 82 away from the disk surface.

A head actuator 90 which meets the objects of small height and low cost is shown in the assembly view of FIG. 1, the exploded view of FIG. 2 and to greater advantage in FIG. 18.

FIG. 18 shows a post 98 that is pressed into hole 96 of arm support section 80. Post 98 extends upward and downward so that its ends are pivotally socketed in the lid 52 and box 50 of the housing (see FIG. 2). Arm section 80 has its connecting end secured to the post 98 and has pins 102 extending from one side toward the actuator 90. A wobble disk 104 is postioned so that the post and pins 102 pass respectively through oversized center hole 106 and two oversized slots 108. a nest of three electromagnets 110 is secured to the bottom of the housing, concentric with the post 98.

FIG. 19 is a sectional view along a line of sight EE of FIG. 18 showing the wobble disk 104 and post 98 in position within the nest of electromagnets 110. The radius R of the locus of the pole pieces of the electromagnets is larger than the radius r of the wobble disk 104. Each electromagnet 110a,b and c is excited by a coil 112a, b andc.

FIG. 20 shows the coils connected in a Y configuration, each coil connected in series with a rectifier 117a, b and c. The electromagnet is excited by three phase power with each phases exciting one of the coils periodically with d.c. current. Successive excitations of the electromagnet causes the wobble disk 104 to roll around the inside surface of the electromagnets thereby causing the wobble disk to rotate a small increment with every excursion of the wobble disk around the electromagnet inner surface. The small increment of rotation equals:

$$2\pi(R/r-1) \text{ radians.}$$

The pins 102 engaged with the slots 108 also cause the post with arm support 30 attached to turn with the wobble disk 110.

By placing the two head devices between the disks, the head devices attached to strip ends 89 can be arranged to lie in substantially the same plane parallel to the disks. Therefore, the overall thickness of the file includes the sum of two disk thicknesses plus the thickness of one head device. This thickness is less than the thickness of the usual arrangement in which one disk has a head device on each side.

The arrangement of the pair of head devices interposed between recording surfaces of two disks facing one another provides that the force of one head device on one disk balances the force of the other head device on the opposite disk surface so that the net torque on the shaft on which the disks are mounted is zero thereby eliminating frictional force generated at the bearing interfaces between the ends of the shaft supporting the disk and shaft housing.

Yet another advantage of the arrangement of the assembly of head devices between the disks is the elimination of contamination from the head disk interface as discussed in connection with FIG. 6.

FIG. 6 shows a cross sectional view of a preferred bearing construction and arrangement of this invention. A bearing sphere 29 is ground to have two parallel shoulders 33 on which the disks 12 are securely positioned. The sphere 29 is a hard wear resistant medium such as glass, ceramic, ruby, sapphire, hardened steel, etc. Two cylindrical cavities 34 having spherical bottoms are formed on the interior surface of the file housing 40, each cavity receiving the section of the bearing spherical surface surrounded by one of the shoulders. The radius of the bearing sphere is slightly greater than the radius of the cavity bottom. Lubricating oil (or grease) is provided in the space 36 between the concave and convex spherical spaces.

FIG. 7 is a diagram of pressure vs. distance, r, from the axis of rotation inside the bearing space as the bearing sphere rotates. The relative velocity between the concave and convex spherical surfaces is greater at larger values of r and also because the spacing between the convex and concave surfaces is smaller for larger values of r. Both the larger relative velocity and the closer spacing result in greater viscous forces which increase the pressure of the grease as illustrated in FIG. 7. This increased pressure maintains the grease inside the bearing surface interface and acts to prevent wear debris from escaping from the bearing area.

If wear debris were to escape from the bearing region, 36, it would have to migrate (by Brownian motion) all the way along the path, represented by dotted line 38 to the outside of the disk then back to the head-disk interface between the disks. In order to prevent this migration, it is an embodiment of this invention to make the spaces 37 between the outside surfaces of the disks and the interior surfaces of the housing wall as small as possible and to condition these surfaces to trap debris particles. Conditioning may be accomplished, for example, by depositing a thin film 42 (FIG. 6) of an adhesive such as VISTANEX on at least a portion of the outer disk surface and inner housing surface. VISTANEX is an adhesive coating sold by the Exxon Corp.

FIG. 8 shows in cross section a second embodiment of a bearing configuration for suppporting the disks. A bearing cup 39 is supported in each wall 40 of the file housing. A shaft 42 has pointed ends 44, each end supported in a recessed bearing cup 39. The shaft 42 is the axis for a collar 45 which supports a disk 12 on each shoulder 46. Two features mitigate against wear of the ends 44 of the shaft in contact with the surface ofthe bearing cup 38. One feature is that each bearing cup is a jewelled bearing. The second is that the forces of the heads against disks are balanced as discussed above so that the net moment and force on the shaft from the head load is zero as discussed above.

Referring to FIG. 1 and 2, the file housing comprises a box 50 havinga bottom wall that supports one end of the bearing and a lid 52 that supports the other end of the bearing. The box is formed of a plastic having some resiliency and the box and lid are shaped so that a biasing force is applied by the housing against the ends of the bearing when the bearing supporting the disks is supported inside the housing.

The bearing support structures in combination with the balanced head loading described above permit that a larger fraction of disk surface can be utilized for recording than files of the prior art, i.e., the ratio of the diameters of the outside track to the inside tack is relatively large. This would result in bit crowding on the inside track if information were recorded at the same frequency on the inside tracks as on the outside tracks. Therefore, in order to eliminate bit crowding, it is a feature of this invention that the disk surface is divided into zones such that information is recorded at a smaller frequency in zones close to the axis of the disk than on zones that are located close to the rim of the disk. The zones may be detected by a subroutine permanently inscribed as a pattern of pits in the disk surface that is read by the read/write head device.

In one embodiment, the disk comprises a molded polycarbonate substrate whose surface is coated by a magnetic film that may be deposited, e.g., by sputtering. Alternatively, the disk is comprises a metal substrate coated with the magnetic film. The molded substrate surface contains a substantially circumferential pattern of indentations. These indentations provide a permanent magnetic flux pattern that is readable by either a read/write head device or a magnetoresistive head device.

The pattern of indentations is formed on the disk surface by molding if the disk substrate is polycarbonate or stamping if the disk substrate is metal. In either case, the process for forming the molding surface or the stamping surface is illustrated by the flow diagram in FIG. 10.

In step 1, the surface of the metal stamp that is to eventually mold or stamp the surface of the disk substrate is polished, preferably to a finish of about one microinch rms.

In step 2, the polished surface is covered with a thin lacquer (acrylic) film.

In step 3, spot areas of the surface with lacquer film is radiated with a laser beam which makes holes in the film and exposes surfaces of the metal film according to the indentation pattern to be formed in the disk.

In step 4, the stamp is immersed in an electroplating bath (nickel plating is preferred) so that a nickel plating is deposited in the holes in the film on the surface of the stamp.

In step 5, the acrylic film is washed from the surface of the stamp leaving a pattern of asperities which form indentations on the metal or polycarbonate surface of the disk substrate when the substrate surfaces are pressed against the stamp surface.

It is an embodiment of this invention that a pit pattern can be formed on part of a track leaving the rest of the same track for storing temporary data. Both permanent data (the pits) and the temporary data can be read with the same read/write head. This feature provides an additional versatility in the processing of data in that the permanent information pattern can comprise subroutines that provide instructions for handling temporary data stored on that particular track.

The pit pattern can also be used to permanently store track and sector number on the track.

One embodiment involving the pit pattern is to imprint a continuous string of pits on each side of the track thereby defining the track boundaries so that the permanent boundary tracks may be used to servo the head to the track.

The pits are spaced twice as close on one side as on the other side providing that the head may detect excursions from the center of the track by sensing either one of frequencies.

An example of a section of a typical track pattern is shown in FIG. 11. Servo pits 54 A and 54 B are shown on opposite sides of the track, respectively. These servo pits are 11.81 microinches wide. On one (A) side of the track, each servo pit is 22 microinches long and spaced 22 microinches from its neighbor. On the other side of the track, each servo pit is 44 microinches long and spaced 44 microinches from its neighbor. As discussed above, the frequency of the servo signal detected from track 54 A is twice the frequency of the servo signal from track 54 B.

The continuous servo positioning of the head with respect to the track as discussed in the foregoing paragraph is especially effective in overcoming the problem of head-track displacement due to temperature changes resulting in differences in thermal expansion of the disk and arm support for the head assembly.

FIG. 11 also shows the sector pits 55 and the track number pits 57 formed in the track area. These pits are about 35 microinches wide. The overall track width is 50 microinches.

Referring again to FIG. 1 and 2, the overall dimensions of the file/card are less than one quarter inch thick by 2.125 inches wide by 3.375 inches long (the length and width of the standard credit card). This may be achieved in accordance with a major object of this invention by virtue of the novel components described above and selecting dimensions of the file components as illustrated in FIG. 22.

FIG. 22 shows a cross section of the file/card assembly taken along line of sight CC of FIG. 1. The parts of the assembly and practical dimensions (in inches) are listed as follows:

| | |
|---|---|
| Box wall 50 | .025 inches |
| wall to disk spacing 100 | .010 |
| Magnetic ring 14 | .045 |
| Head support strip 82 | .007 |
| Head device thickness 28 | .040 |
| Head support section 80 | .030 |
| Head support strip 82 | .007 |
| Magnetic ring 14 | .045 |
| Wall to disk spacing 100 | .010 |
| Lid wall 52 | .025 |

-continued

| Total File/card thickness 10 | 0.250 inches |
|---|---|

FIG. 22 shows that the overall thickness of the actuator in this embodiment is 0.080 inches.

In one embodiment, the housing is adapted for attachment to a THIN CARD DRIVE support which is compatible with the PCMCIA pc card standard. This is accomplished by providing the file card assembly with a pc board plug 101 as illustrated in FIG. 2.

The pluggable feature and dimensions of the file/card provide that the file may be installed in the "mother" receptacle of an array of cards or easily replaced as the circumstances require. Such a situation could be, e.g., when it is required to transfer a file/card from one computer to another or when it is required to replace operating system information permanently recorded on one file/card with different operating system information recorded on another file/card.

In the foregoing paragraphs, a file/card (disc file on a printed circuit card) has been described which meets the objects of this invention. A construction has been described which is inherently much thinner than constructions described in the prior art. This efficient use of space is made possible by the use of a rotor mounted on the rim of the disks and by positioning the assembly of head devices in the space between two disks. This arangement together which the construction of the bearing mitigates against the presence of debris at the head disk interface due to bearing wear. Achievable bit density is increased by eliminating head scew. A system for actuating the head assembly involving a "wobble disk" rotary actuator is characterized by small dimension particularly parallel to the disk axis. A flat coil head construction is described which is characterized by small dimension perpendicular to the recording surface. Permanent recording of data as a pattern of pits in the disk surface, readable by the same read/write head device used to record and read data on the same track, extends the potential of the central processing unit to operate on the data. The small size and economical cost of the file/card provides that the file/card can be readily mounted inside the computer along with other file cards thereby improving operating characteristics such as signal propagation, the ability to conveniently exchange file/cards depending on the subroutines permanently written as etched pit patterns are required and further providing greater versatility in writing programs.

It should be understood that various modifications within the scope of this invention can be made by one of ordinary skill in the art without departing from the spirit thereof. I therefore wish my invention to be defined by the scope of the appended claims and in view of the specification if need be.

We claim:

1. A disk file which comprises:
   a housing having a base wall;
   a disk means having at least one disk with a rim and an information storage surface;
   a bearing means supported by said housing for rotatably supporting said disk means substantially at a center of said at least one disk;
   a head assembly means with at least one read/write head for writing and reading said information on said information storage surface;
   a means for supporting said head assembly means with said at least one read/write head positioned on said information storage surface of said disk means;
   an actuator means mounted on said base wall supporting said head assembly supporting means for positioning said read/write head at selected locations on said information storage surface;
   a rotor magnet means for turning said disk means attached to at least one rim of said at least one said disk;
   a stator means supported on said base wall outside and around said rim and adjacent to said rotor means for driving said rotor means;

2. A disk file as in claim 1 wherein said housing means comprises:
   a box having a bottom wall and an opening;
   a lid having an interior surface facing said box and secured to said box over said opening; and
   said bearing means having two ends, one said end rotatably secured to said lid interior surface and another said end rotatably secured to said bottom wall.

3. A disk file as in claim 1 wherein:
   said disk means includes two disks;
   said area for storing information includes an area on a surface of each disk facing one another;
   said head assembly means comprises two read/write head devices;
   said head support means supporting one said head device against one said disk area and supporting said other head device against said other disk area thereby forming two head-disk interfaces.

4. A disk file as in claim 3 wherein said housing has a lid parallel to said base wall between which said disks are located with one disk having an outside surface facing said base wall and said other disk having an outside surface facing said lid and each said disk has a center hole and said bearing means comprises:
   an axle having two ends;
   said axle having two shoulders, one shoulder adjacent to one end of said axel and the other shoulder adjacent to the other end of said axel;
   one disk securely supported on one shoulder and the other disk supported on said other shoulder with one end of said axle passing through one said center hole of one said disk and said other end passing through said center hole of said other disk;
   means secured to said lid for rotatably supporting one said end of said axel and means secured to said base wall for rotatably supporting the other said end.

5. A disk file as in claim 4 wherein:
   each said outside surface of said disks has areas treated with adhesive located such as to trap wear debris generated by said bearing means and prevent said debris from migrating to said head disk interfaces.

6. A disk file as in claim 4 wherein:
   each said end has a convex spherical surface;
   said rotatably supporting means secured to said base wall is a recess having a concave spherical bottom in said base wall and said rotatably securing means secured in said lid is a recess in said lid, each recess engaging one of said ends respectively with a space between said convex and concave spherical surraces where lubrication is sealably retained,
   each said recess positioned to support said disks parallel to said walls.

7. A disk file as in claim 4 wherein:
each said end has a substantially pointed end;
said rotatably supporting means for said ends comprises two cups, each cup having a tapered recess and engaging one of said pointed ends;
one cup secured to said base wall and said other cup secured to said lid.

8. A disk file as in claim 1 which comprises a means for lifting said head assembly means from said recording area means.

9. A disk file as in claim 8 wherein said lifting means comprises a magnet supported on said base such as to lift said read/write head from said recording surface when said head assembly means is moved to a location proximal to said magnet.

10. A disk file as in claim 1 wherein:
said rotor magnet means is a plurality of magnetized segments joined end to end forming a continuous ring where each segment is magnetized in a direction opposite its neighboring segments, said ring attached to and concentric with said rim;
each segment magnetized in a direction opposite its neighboring segmensts.

11. A disk file as in claim 10 wherein said ring is neodymium.

12. A disk file as in claim 10 wherein said stator means supported on said base wall comprises:
a plurality of laminations arranged in a stack and shaped substantially like a comb having teeth with teeth ends;
said ends of said teeth lying in an arc around and outside said ferromagnetic ring;
at least one coil of wire wrapped in a pattern of loops around said teeth of said stator means.

13. A disk file as in claim 12 wherein said at least one coil comprises three coils, each coil having one end connected to an end of each other said coil to form a center tap thereby providing that said motor may be powered by a three phase electrical power source in a bipolar mode wherein each phase is connected across one of said coils.

14. A disk file as in claim 12 which has means operatively connected to said coils for commutating motor current in said coils.

15. A disk file as in claim 14 wherein said commutating means comprises an integrated circuit having input terminals connected to one said pair of said coils thereby providing that back electromotive force generated in said coil with terminals connected to said input terminals is detected by said integrated circuit which thereby commutates said motor current.

16. A disk file as in claim 14 wherein said means for commutating comprises at least one Hall cell switch positioned such as to sense said flux pattern of said rotating ring.

17. A disk file as in claim 14 wherein said means for commutating comprises at least one reflecting surface on said rotor and an optical detector switch operatively connected to said coils and positioned such as to receive optical reflections from said at least one reflecting surface.

18. A disk file as in claim 1 wherein said area of magnetic medium has a pattern of pits arranged as permanent information that can be read by said read/write head means.

19. A disk file as in claim 18 wherein said information comprises track identification.

20. A disk file as in claim 18 wherein said information comprises sector information.

21. A disk file as in claim 18 wherein said information comprises servo information means for maintaining said head on track.

22. A disk file as in claim 21 wherein said pattern of pits is a row of pits on a first side of each said track having a first length, width and spacing between pits and a row of pits on a second side of each said track having a second width, length and spacing between pits thereby generating a first flux pattern on one side of said track that is different from a second flux pattern generated on a second side of said track.

23. A disk file as in claim 1 which comprises:
electrical termination pins leading to said motor means and said read/write head assembly means;
means for plugging said housing into a printed card receptacle having pin connectors thereby providing that said disk file may be electrically connected to a controller.

24. A disk drive as in claim 1 wherein said actuator means comprises:
a ring of electromagnet members supported on said base wall said electromagnet ring oriented parallel to said base wall;
a disk member having slots and positioned inside said ring such that said disk member rolls around an inside surface of said electromagnetic ring when said electromagnetic is energized;
said disk member having a center hole and at least one slot between said center hole and a perimeter of said disk;
post means operatively connected to said head assembly means for supporting said read/write head on said information storage surface;
said post means positioned through said center hole of said disk member and having one end rotatably mounted on said base wall and another end rotatably mounted on said housing;
at least one pin member, each pin member having one end secured to said post and located through one of said at least one slot such that, as said disk rolls around inside said electromagnetic ring, said pin positioned in said slot turns said post.

25. A disk drive as in claim 1 wherein said head support means comprises:
an arm support means for supporting said head assembly means with said head assembly means mounted on a first end in proximity to said magnetic recording area and a second end;
a means for actuating said head on said magnetic recording area, coupled to said second end of said arm support and supported by said housing.

26. A disk drive as in claim 25 wherein said head assembly means comprises:
a first section having an outer end and a first joint end;
means for connecting said outer end to said head assembly means in a position to provide that said head assembly means can read and write information on said magnetic recording surface;
a second section having a second joint end rotatably connected to said first joint end to form a joint between said first and second sections and an actuator end that is secured to said actuator;
a link member having a moving end rotably joined to said first section at a first location and a stationary end that is rotatably secured to said housing means at a second location, said first and second locations chosen in operable combination with said link member and said first and second sections and said head assembly means such as to prevent head skew.

27. A disk drive as in claim 26 wherein:
said head assembly means includes two head devices; and said first section comprises:
two parallel strip means spaced apart to permit said second joint end to be interposed between said strip means at said joint for rotably mounting said strip means to said second section at said joint;
each said strip means contoured at said outer end in operable combination with one of said head devices to support said head device in a position for magnetic recording on said area of said disk surface.

28. A disk file as inn claim 1 wherein:
said at least one read/write head comprises:
a substrate having a surface;
a conducting flat coil supported on said surface;
a ferromagnetic film having an outer boundary and deposited on said surface and at least a portion of said coil with an electrically insulating layer between said flat coil and said ferromagnetic film;
said ferromagnetic film having an elongated read/write gap in said film;
said ferromagnetic film having a direction of easy magnetization in said coil that is in the plane of the film parallel to said elongated gap whereby, in the absence of current, there are no free magnetic poles along the gap;
said flat coil configured such that when electrical current is passed through said flat coil, said film remagnetises and forms magnetic poles on edges of said gap and thereby generates a magnetic field.

29. A disk file as in claim 28 wherein said substrate is a ferrite thereby providing that any flux emanating from said film boundary will be captured by said ferrite.

30. A disk file as in claim 28 wherein said head device comprises a Hall element imbedded in said substrate proximal to said gap.

31. A disk file as in claim 29 wherein said Hall element comprises:
a semiconductor medium having a semiconductor surface with a first and second pair of contacts arranged such that when electrical current passes through one contact to the other contact of the first pair and a magnetic field from said magnetic recording surface penetrates said semiconductor surface, a Hall voltage is generated between said contacts of said second pair.

32. A disk file as in claim 1 wherein
each said at least one head comprises:
a glass strip having a first and second end and a cross section contoured to have a shape like the letter end, said L-shaped cross section having two legs each leg having an outside flat surface opposing an inside surface and perpendicular to said inside and iutside surfaces of said other leg;
a thin magnetic film deposited on said outside surface of said first leg;
a coil around said first leg;
a magnetic core having a U shape with two core leg straddling said coil and secured to said outside surface of said first leg such as to provide a read/write gap at said first end;
means for attaching said second end to to said head support means with said gap positioned to read and write on said recording area.

33. A disk file as in claim 1 which further comprises a row of pin connectors operably secured to said housing means to provide that disk file may be inserted in a receptacle for printed circuit booards.

34. A motor drive for an array of at least one memory disk, said array roatably supported at its center on a base, each disk having a rim, which drive comprises:
a rotor magnet means for turning said disk attached around said at least one of said rims;
a stator means supported on said base around and outside said rim and adjacent to said rotor means for driving said rotor means.

35. A motor drive as in claim 34 wherein:
said rotor means is a ring of ferromagnetic segments concentric with and attached to said rim;
each said segment joined end to end to neighboring segments forming said continuous ring and each segment magnetized in a direction opposite its neighboring segments.

36. A motor drive as in claim 35 wherein said ferromagnetic material is neodymium.

37. A motor drive as in claim 35 wherein said stator means comprises:
a plurality of laminations, parallel to said disks and arranged in a stack and having a shape substantially like a comb having teeth with teeth ends;
said ends of said teeth lying in an area outside and around said ferromagnetic ring;
at least one coil of wire having a pair of terminals and wrapped in a pattern of loops around said teeth of said stator means.

38. A motor drive as in claim 37 wherein said at least one coil is a plurality of a plurality of coils, each coil wrapped around one group of a plurality of groups of teeth, each group sharing teeth with another group such that cogging of said motor is prevented.

39. A motor drive unit as in claim 38 wherein said at least one coil of wire comprises three coils, each coil having one end connected to an end of each of said other coils thereby providing that said motor may be driven by a three phase power source in a bipolar mode.

40. A motor drive as in claim 37 which has means operatively connected to said stator means for commutating current in said coils.

41. A motor drive as in claim 40 wherein said commutating means comprises an integrated circuit having input terminals connected to one said pair of said coils thereby providing that back electromotive force generated in said coil with terminals connected to said input terminals is detected by said integrated circuit which thereby commutates said motor current.

42. A motor drive as in claim 40 wherein said means for commutating comprises at least one Hall cell switch positioned to sense said flux pattern of said rotating ring.

43. A motor drive as in claim 40 wherein said means for commutating has at least one reflecting surface on said rotor and an optical detector switch positioned to receive optical reflections from said at least one reflecting surface and operatively connected to said coils such as to comutate current in said coils.

* * * * *

UNITED STATES PATENT AND TRADEMARK OFFICE
CERTIFICATE OF CORRECTION

PATENT NO. : 5,251,082         Page 1 of 2

DATED : October 5, 1993

INVENTOR(S) : T. J. Elliott, R. W. Herman, W. L. Cooper, R.S. Smith

It is certified that error appears in the above-indentified patent and that said Letters Patent is hereby corrected as shown below:

After "FIG. delete "12" insert --11-- col. 10, lines 3,4;

After "FIG" delete "14" inser --13-- col 10, lines3,49,53;
After "AA" dlete "of FIG. 12"     col 10 line 4
After "FIG" delete "15" insert --14-- col 10 line 26;
Afterr "Fig" delete "16" insert --14 and 15-- col 10, line 39;
After "FIG" delete "16" insert --15-- col 10, line 43;
After "FIG" delete "21" insert --20-- col 10, line 56;
After "1," delete "17" insert --16A-- col 10, line 66;
After "Fig." delete "10" insert --9-- col 13 line 54;
After "surface" insert --coated-- col 13, line 61;
After "Fig" delete "11" insert --10-- col14, line 27, 42;
After "FIG" delete "22" insert --21-- col 14 lines54,55 col 15 line 5
After "FIG" delete "17" insert --16-- col 11 lines 9,20,31,24, 26;
After "FIG" delete "18" insert --17-- col. 11, lines 42,43,54;
After "FIG" delete "19" insert --18-- col 11 line 53;
After "FIG" delete "20" insert --19-- col 11, line 61;
After "FIGS" delete "14, 21 insert --13-- col 11, line 26
After "detector" delete "is" col 10 line 50.
After "FIG" delete "4" inser --1-- col 9, line 9;
After "FIG" delete "10" insert --21-- col 9 line 13;
After "FIGS" delete "4 and 22" insert --1 and 10--col9, line 19;

UNITED STATES PATENT AND TRADEMARK OFFICE
CERTIFICATE OF CORRECTION

PATENT NO. : 5,251,082

DATED : October 5, 1993

INVENTOR(S) : T. J. Elliott, R. W. Herman, W. L. Cooper, R. S. Smith

It is certified that error appears in the above-indentified patent and that said Letters Patent is hereby corrected as shown below:

After "FIG" delete "13" "13b", and "13c" insert —12A,B,C— Col. 10, lines 2,15, 5, 29;

Signed and Sealed this

Twenty-first Day of February, 1995

*Attest:*

BRUCE LEHMAN

*Attesting Officer*     *Commissioner of Patents and Trademarks*